US007853360B2

(12) United States Patent
Kissler Fernandez et al.

(10) Patent No.: US 7,853,360 B2
(45) Date of Patent: Dec. 14, 2010

(54) METHOD AND DEVICE FOR DETERMINING A PWM SIGNAL ON WHICH A DITHER FREQUENCY IS SUPERIMPOSED IN ORDER TO CONTROL A SOLENOID VALVE

(75) Inventors: Jose Cruz Kissler Fernandez, Bad Abbach (DE); Röhrl Thomas, Barbing (DE)

(73) Assignee: Continental Automotive GmbH, Hannover (DE)

( * ) Notice: Subject to any disclaimer, the term of this patent is extended or adjusted under 35 U.S.C. 154(b) by 921 days.

(21) Appl. No.: 11/664,929

(22) PCT Filed: Sep. 14, 2005

(86) PCT No.: PCT/EP2005/054567

§ 371 (c)(1),
(2), (4) Date: Apr. 6, 2007

(87) PCT Pub. No.: WO2006/037715

PCT Pub. Date: Apr. 13, 2006

(65) Prior Publication Data

US 2009/0005913 A1    Jan. 1, 2009

(30) Foreign Application Priority Data

Oct. 6, 2004    (DE)    ........................ 10 2004 048 706

(51) Int. Cl.
*G05B 15/00*    (2006.01)
(52) U.S. Cl. ......................................... 700/275; 700/56
(58) Field of Classification Search .................. 700/56, 700/275, 282, 306
See application file for complete search history.

(56) References Cited

U.S. PATENT DOCUMENTS 4,960,365 A    10/1990    Horiuchi (Continued)

FOREIGN PATENT DOCUMENTS

DE    44 23 102 A1    1/1996

(Continued)

OTHER PUBLICATIONS

Kuehn et al., PCT Pub. No. WO-2004/027529-A1 with English translation, Apr. 1, 2004.*

*Primary Examiner*—Paul L Rodriguez
*Assistant Examiner*—Carlos Ortiz Rodriguez
(74) *Attorney, Agent, or Firm*—Laurence A. Greenberg; Werner H. Stemer; Ralph E. Locher

(57) ABSTRACT

A PWM signal on which a dither signal is superimposed is used for adjusting a central position when controlling a solenoid valve. To improve this type of control process in which the amplitude of the dither signal depends on the current of the solenoid valve and thus on the PWM signal, the PWM signal and the dither signal are generated in a computer unit independently of the power regulation process. Forming the signals separately has the advantage of generating a constant amplitude for the dither signal each time a triggering signal is generated for the solenoid valve such that the armature of the solenoid valve can oscillate specifically about the central position and thereof at constant small vibrations. This allows frictional forces to be reliably reduced and the solenoid valve to be switched more rapidly while the load on the main computer is reduced.

14 Claims, 3 Drawing Sheets

U.S. PATENT DOCUMENTS

| | | | |
|---|---|---|---|
| 5,200,911 A | * | 4/1993 | Ishikawa et al. ............... 701/43 |
| 5,594,324 A | * | 1/1997 | Canter et al. ................. 323/282 |
| 5,673,166 A | * | 9/1997 | Hoffman .................... 361/160 |
| 6,155,654 A | | 12/2000 | Oyama |

FOREIGN PATENT DOCUMENTS

| | | |
|---|---|---|
| EP | 0 929 020 A2 | 7/1999 |

\* cited by examiner

METHOD AND DEVICE FOR DETERMINING A PWM SIGNAL ON WHICH A DITHER FREQUENCY IS SUPERIMPOSED IN ORDER TO CONTROL A SOLENOID VALVE

BACKGROUND OF THE INVENTION

Field of the Invention

According to the preamble of claim 1 the invention starts from a method for determining a control signal for a solenoid valve. The control signal is formed by a PWM signal (pulse width modulated signal) on which a dither signal with a low frequency is superimposed. The control signal has such a high frequency that the armature of the solenoid valve assumes an intermediate position, preferably a central position (position "half open"), between an open position and a closed position. The dither signal should in the process cause the armature of the solenoid valve to perform a slight oscillation in the central position. Friction resistances at the moving parts in the solenoid valve are reduced as a result, so the solenoid valve can be switched more quickly and precisely.

An alternative embodiment of the invention, according to the preamble of claim 7, starts from a device for controlling a solenoid valve. This device operates according to the above method and comprises a current regulator, a dither unit and a PWM unit.

Solenoid valves are used in particular in motor vehicles to open or close ducts in hydraulic conduits. For example, using solenoid valves in an automatic transmission the individual gear ratio levels can be shifted smoothly and with low wear. The solenoid valves are very often operated by means of PWM signals at a frequency that is high for the solenoid valve, for example at 1 KHz, in the linear or analog range. The armature of the solenoid valve cannot synchronously follow this high control frequency in mechanical terms and assumes an intermediate position. With a pulse-duty factor of 50% of the PWM signal this then corresponds to the central position of the valve "half open".

One drawback to this solution is that both the armature and the valve controlling the flow rate are subject to mechanical frictional forces which lead to inexact regulation of the valve position. In addition, the magnetic circuit exhibits a hysteresis which also causes the control accuracy to deteriorate.

Previously these problems were solved in that the frequency of the control signal has been reduced to such an extent, for example to 300 Hz, that the armature can still just about follow and in the intermediate position or central position is preferably deflected only minimally. This results in oscillation of the armature, and of the valve connected thereto, about the intermediate position at low amplitude which is conventionally called dither oscillation (dither signal). This dither oscillation is desired in principle since the friction resistances at the moving parts of the solenoid valve may be reduced thereby. However, it is very difficult to stipulate an optimally constant dither signal amplitude since the dither signal depends on the PWM frequency and on the pulse-duty factor (duty cycle) and therefore on the coil current flowing in the solenoid valve. With the known method it is therefore not possible for the dither signal to form a constant amplitude since the PWM frequency has to be continuously adjusted as a function of the stipulated desired current value and in the process the amplitude and the frequency of the dither signal change accordingly. A constant amplitude and a constant frequency for the dither signal cannot be achieved with the known method.

A further known solution for said problems consists in a low-frequency dither signal being superimposed on the high frequency of the PWM signal by amplitude modulation. The high frequency is generated by a current regulator (two-position regulator) which controls the regulation of the valve current mean. The low modulation frequency (dither frequency) is achieved by changing the desired current value. This solution is achieved using hardware which is provided with a specific module and comprises a correspondingly embodied integrated circuit (IC) to achieve optimally short reaction times. This solution is cost-intensive in addition to being very inflexible since the integrated circuit can generate dither signals that are suitable only for a specific type of solenoid valve.

In a further known solution the current regulator is simulated by a special software program. In this case the software program is a component of a main program of a computer unit. Firstly the dither signal is generated by modulation of the desired value upstream of the current regulator signal. Only low dither frequencies may be used with this solution, however. If the dither frequency is in the range of the control frequency, however, undesirable low-frequency beating of the magnetic current can occur. Even the hydraulic system may be damaged thereby. The beating results because the dither frequency cannot be synchronized with the control frequency.

SUMMARY OF THE INVENTION

The object underlying the invention is to improve the control of a solenoid valve with a dither signal. This object is achieved by the characterizing features of the coordinated claims 1 and 7.

The method according to the invention for determining a control signal for a solenoid valve and the device with the characterizing features of the coordinated claims 1 and 7 result in the advantage that the dither signal and the PWM signal can be generated independently of the current regulation of the current regulator. A constant amplitude for the dither signal may advantageously be formed thereby, so the armature of the solenoid valve always oscillates about its central position with identical excursions, without the control frequency of the PWM signal being able to have an adverse effect. The resulting reduced friction resistance therefore allows the position of the armature to be advantageously adjusted and controlled much more accurately. The fact that the load on the main processor, which, with a multiplicity of control functions, is fully utilized anyway, can be significantly reduced is also regarded as a particular advantage. The main processor is thus available for other functions.

The measures recited in the dependent claims provide advantageous developments of and improvements to the method and device disclosed in the coordinated claims 1 and 7. The low frequency of the dither signal means that the oscillation of the solenoid valve armature can be individually adjusted to the type of solenoid valve being used, so, compared with the known hardware solution, an extremely high level of flexibility results because the adaptation to other types of solenoid valve can take place by way of a simple calibration process. It is also advantageous that even high dither frequencies may be used to reduce the friction resistance further without a lot of additional expenditure.

It has proven to be an advantageous solution to choose the frequency for the dither signal in such a way that it amounts to an even-numbered divisor, preferably a quarter of the frequency of the PWM signal. This prevents beats or other disruptive effects from being able to form under any operating conditions.

For a specific group of solenoid valves it has proven to be advantageous to choose the frequency for the dither signal in the range between 100 and 500 Hz.

To control the central position of the solenoid valve armature it is provided that for the combined dither signal and PWM signal for example two extended and thereafter two shortened PWM signals are formed in each case. By way of this measure the pulse-duty factor is changed by the desired amplitude of the dither signal exactly every other cycle. This results in a frequency for the dither signal which is exactly one quarter of the frequency of the PWM signal.

According to the invention it is also provided that the time-controlled computer unit is briefly stopped in the case of a current step and the dither signal is switched on again after the transient oscillation to attain more rapid oscillation behavior.

In the case of the device it also seems advantageous to use a time-controlled computing unit (Time Processing Unit) as an additional computer unit to synchronize the two signals with the current signal in an easy manner.

The easiest way to produce the control signal for the solenoid valve, superimposed from the dither signal and the PWM signal, is using a software program. Compared with a hardware solution this solution is particularly flexible especially for adaptation to different types of solenoid valve.

The device according to the invention seems to be particularly advantageous for controlling a mechanical unit in a motor vehicle, preferably for an automatic transmission, since the individual gear ratio levels may be shifted in a manner that is sparing to the material, smooth and barely perceptible to the driver.

An exemplary embodiment of the invention is illustrated in the drawings and will be described in more detail in the following description.

DESCRIPTION OF THE PREFERRED EMBODIMENTS

Figure 1:
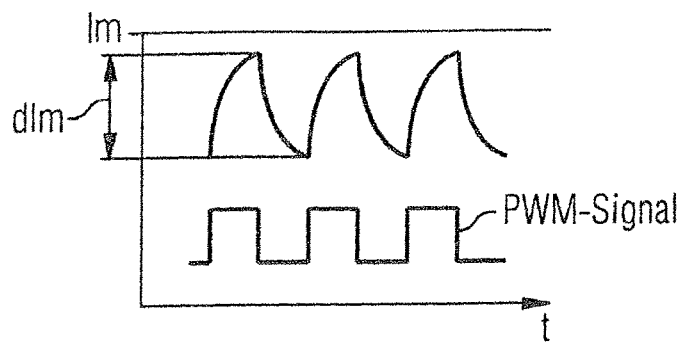
FIG. 1 shows, in the case of a known method, in the upper part a first graph with a current characteristic of a solenoid valve and in the lower part an associated PWM signal with a pulse-duty factor of 50%.

For the purpose of better understanding of the invention it will first of all be described with reference to FIG. 1 to 3 how in the known prior art a control signal for controlling a solenoid valve is formed. As may be seen from FIG. 1, the control frequency of the PWM signal is reduced, for example to 300 Hz, to the extent that with a pulse-duty factor of 50% the solenoid valve armature can still just about follow the PWM signal. This results in oscillation of the armature about the central position with the armature being deflected only slightly. This oscillation about the central position is also called the dither frequency in technical speak. The upper graph shows a characteristic for the current measured at the solenoid valve. The lower part of FIG. 1 shows the corresponding control signal as a voltage signal, which is formed as the pulse-width modulated signal (PWM signal). As may be seen in FIG. 1 the amplitude difference dIm is relatively great in this case. This means that the oscillation of the solenoid valve armature about the central position is also relatively great.

Figure 2:
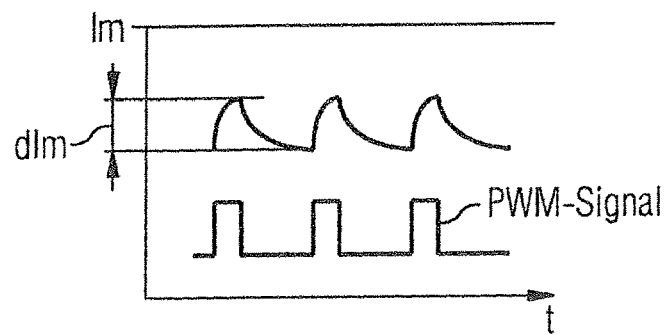
FIG. 2 shows, in the case of a known method, in the upper part a second graph with a current characteristic of a solenoid valve and in the lower part an associated PWM signal with a pulse-duty factor of 25%.

In a second graph corresponding to FIG. 2 the pulse-duty factor has been reduced to 25%. The current characteristic in the upper part of the second graph shows a correspondingly smaller amplitude difference dIm. The oscillation of the armature about its central position is also reduced as a result. This behavior leads to different friction resistances at the moving parts of the solenoid valve, so exact position control is rendered difficult.

The lower part of the second graph shows the corresponding PWM signal.

As may be seen from the two graphs in FIGS. 1 and 2, the amplitude of the dither signal is directly dependent on the frequency of the PWM signal as well as the pulse-duty factor. For optimal conditions a constant dither signal amplitude is desirable however. The frequency of the PWM signal therefore has to be continuously adapted as a function of the desired current value. The simultaneous formation of a constant amplitude and a constant frequency for the dither signal is therefore not possible with this known method.

Figure 3:
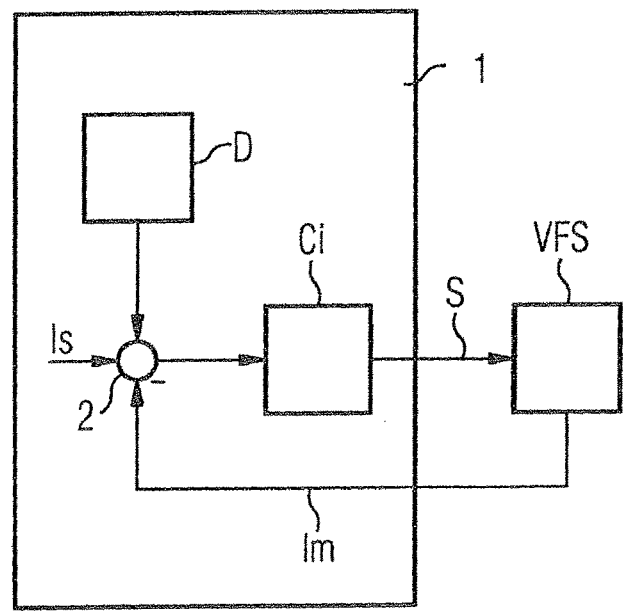
FIG. 3 shows a further known device for forming a control signal for a solenoid valve.

FIG. 3 shows a device 1 of a known circuit arrangement for forming a control signal S for a solenoid valve VFS. It comprises a dither unit D and a current regulator Ci. At a summation point a stipulated desired current Is is combined with a current Im measured at the solenoid valve VFS and the difference is supplied to the current regulator Ci. The current regulator Ci forms a correspondingly corrected control signal for the solenoid valve VFS therefrom. One drawback of this is that this device can only be used for low dither signal frequencies. If on the other hand the dither signal frequency is close to the control frequency of the PWM signal an undesirable low-frequency oscillation in the current may occur. The hydraulic system may also incur damage.

Figure 4:
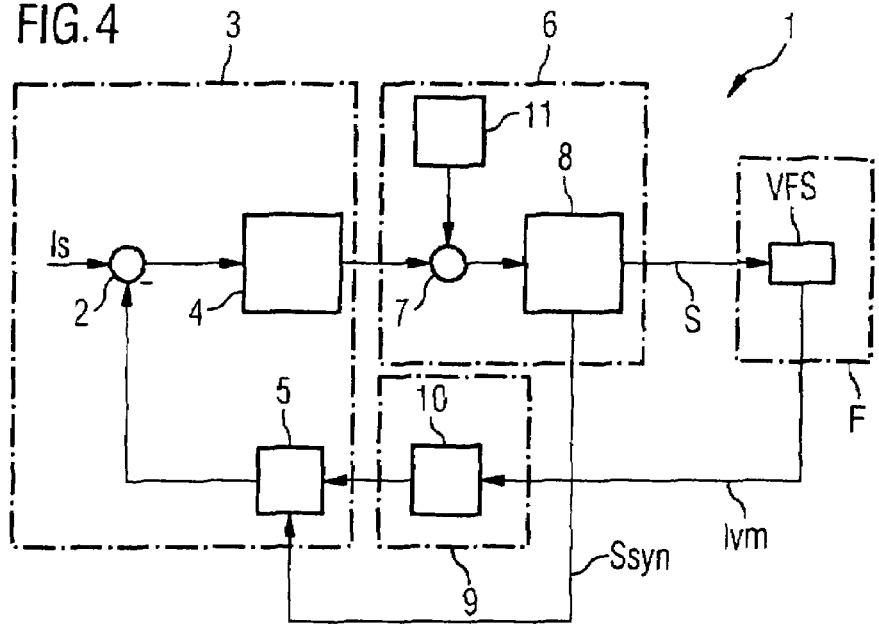
FIG. 4 shows an embodiment of the invention with a device for forming a control signal.

FIG. 4 shows an exemplary embodiment of a device 1 according to the invention for generating a control signal S for a solenoid valve VFS. Essential components are a main computer 3, a computer unit 6 and a filter 10. The main computer 3 already exists in a control device in a vehicle to process various control functions. For example the main computer 3 comprises a software program with which the current regulation for one or more solenoid valve(s) VFS and the pulse-duty factor for the PWM signal can be generated. For this purpose the main computer 3 comprises a current regulator 4 which is preferably embodied as a PID (Proportional Integral Difference) regulator. The PID regulator 4 receives from a-summation point 2 a difference signal which is formed from a desired value Is and a measured and filtered valve current Ivm. An A/D converter 5 is also connected in series and digitizes the valve current Ivm measured at the solenoid valve VFS and filtered. The A/D converter 5 is synchronized with the frequency of the PWM signal. The PID regulator 4 then forms an output variable for the pulse-duty factor (duty cycle) for the PWM signal S.

A further block that is essential to the invention is formed by an independent computer unit 6 which is preferably embodied as a time-controlled computer unit (TPU computer, Timer Processing Unit) and is decoupled from the current regulation for the solenoid valve VFS. The TPU computer 6 is usually already present. It comprises a dither unit 11 and a PWM unit 8 for generating the dither signal and the PWM signal. For this purpose use is made of a software program by means of which the PWM signal and the dither signal are formed with constant amplitude and/or frequency and the two signals are combined.

The two units 8, 11 are controlled by the output signal (control signal) of the PID regulator 4 via a common junction 7. For synchronization of the phase the PWM unit 8 is connected by a line to the A/D converter 5 via which a synchronization signal Ssyn is passed to the A/D converter 5. At the output to the PWM unit 8 the PWM signal on which the frequency of the dither signal is superimposed is accordingly available for controlling the solenoid valve VFS. Generation of the dither signal and the PWM signal is therefore synchronous and the signals are cyclically generated with constant amplitude. The main computer 3 is therefore now only responsible for current regulation, so the load thereon is largely reduced.

A filter unit 9 is provided in a third block. The filter unit 9 essentially comprises a filter 10 which is embodied as a lowpass filter. The lowpass filter 10 is connected upstream of the A/D converter 5 and connected at the input side to the solenoid valve VFS and filters the measured valve current Ivm. The lowpass filter is configured in such a way that the high-frequency signals are preferably filtered out, so the current regulator optimally regulates only to the current mean values.

The method according to the invention synchronizes the frequency of the dither signal and the control frequency of the PWM signal. Undesirable oscillations and consequently possible damage to the hydraulic device are avoided thereby. Furthermore, compared with the PWM frequency, even high frequencies may be produced for the dither signal. Furthermore the software solution means that, in addition to simple adaptation to different solenoid valves VFS, expensive hardware regulators may be dispensed with.

The method according to the invention can also be applied to low dither frequencies since, in terms of control engineering, the dither frequency is stored as a disturbance variable. If the lowpass filter 10 at the input to the current regulator 4 cannot completely filter the dither frequency because the latter is of the same magnitude as the control frequencies, a selective filter can be connected upstream of the current regulator 4 to decouple it from the dither frequency. This allows all applications to be implemented inexpensively.

A further advantage of this arrangement is that with changed parameters, in particular valve parameters, for example a change in the temperature or supply voltage, simple, automatic calculated adaptation can be implemented, so the frequency, the current and the amplitude are kept constant.

The solenoid valve VFS is embodied for a device in a motor vehicle F, for example for an automatic transmission control. Of course any desired solenoid valves VFS may be used with the method according to the invention for various hydraulic devices.

Figure 5:
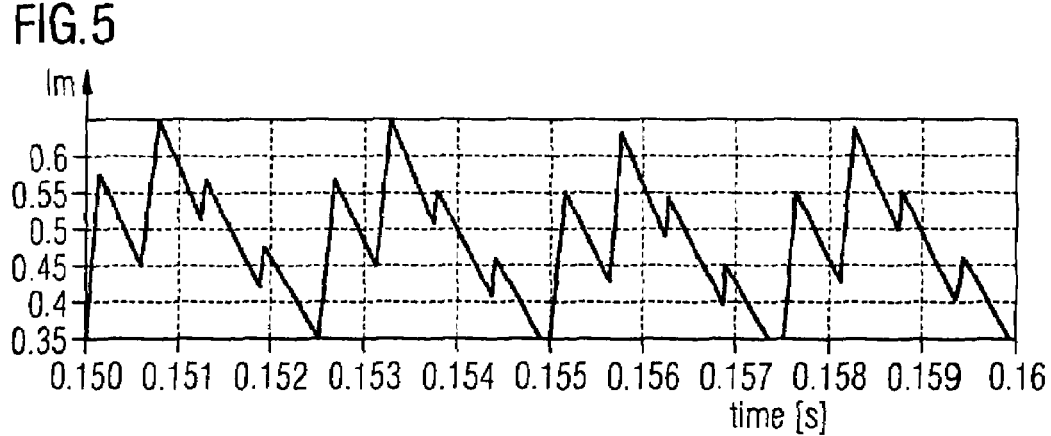
FIG. 5 shows a third graph with a control signal superimposed according to the invention.
Figure 6:
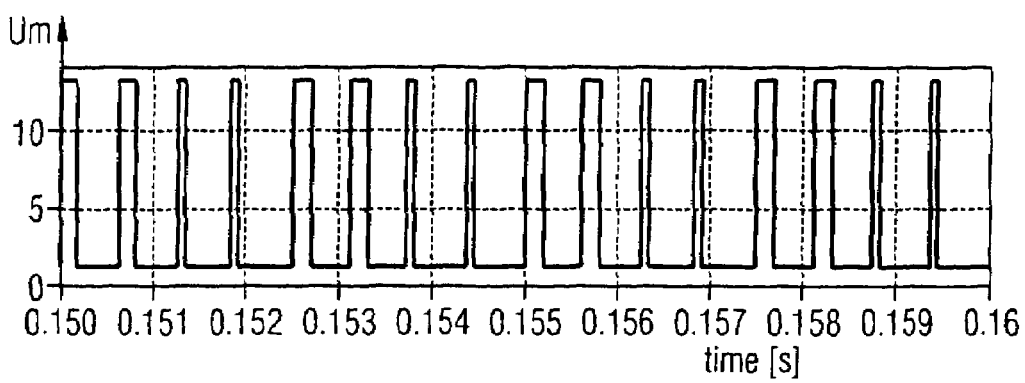
FIG. 6 shows a fourth graph with a PWM signal pertaining thereto.

The mode of operation of this device 1 will be described in more detail with reference to FIGS. 5 to 9. FIG. 5 shows by way of example a characteristic of a valve current Im where the frequency of the dither signal is 400 Hz and that of the PWM signal 1600 Hz. FIG. 5 shows the associated control voltage of the PWM signal. As may be seen from FIG. 6 two shortened PWM voltage pulses are connected downstream of two extended PWM voltage pulses in each case. This procedure is repeated cyclically. As a consequence thereof the current characteristic shown in FIG. 5 results for the measured valve current Im. The first cycle is in phase with the dither frequency at 400 Hz, for example from 0.1500 to 0.1525 s. The "points" in the current characteristic result from the higher frequency (1600 Hz basic frequency) of the PWM signal, one current peak occurring in the case of the increasing half-wave and two current peaks occurring in the case of the decreasing half-wave respectively. The pulse-duty factor is changed by the desired amplitude of the dither signal exactly every second cycle. A synchronized frequency thus results for the dither signal which is exactly a quarter of the frequency of the PWM signal.

In an alternative embodiment of the invention it is provided that other even-numbered divisor ratios may also be used.

The illustrated current characteristic is not affected by the regulated current of the current regulator 4 since the 400 Hz are filtered out. The current regulator 4 therefore only ever regulates to the mean value, for example 0.5 A.

Figure 7:
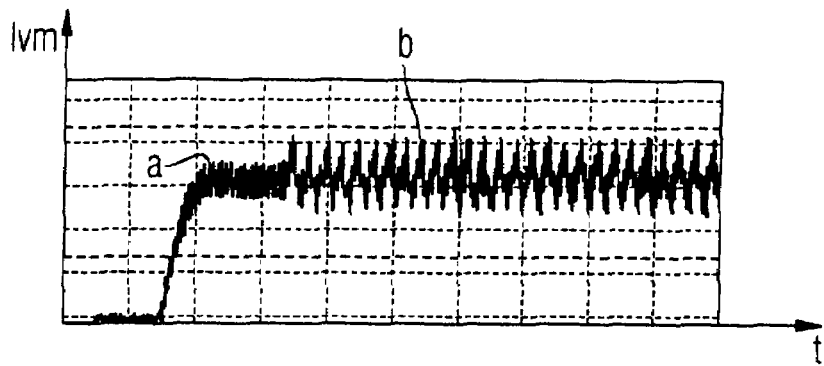
FIG. 7 shows a further current graph with a superimposed dither frequency.

FIG. 7 shows a further graph illustrating a current pulse of the measure valve current Ivm. The current signal firstly oscillates with the high basic frequency (part a of the curve) and thereafter the frequency of the dither signal is applied (part b) to reduce the friction effects of the armature. The position of the armature can be adjusted more quickly thereby. The mechanical excursion is minimal owing to the constant, but low, dither amplitude.

Figure 8:
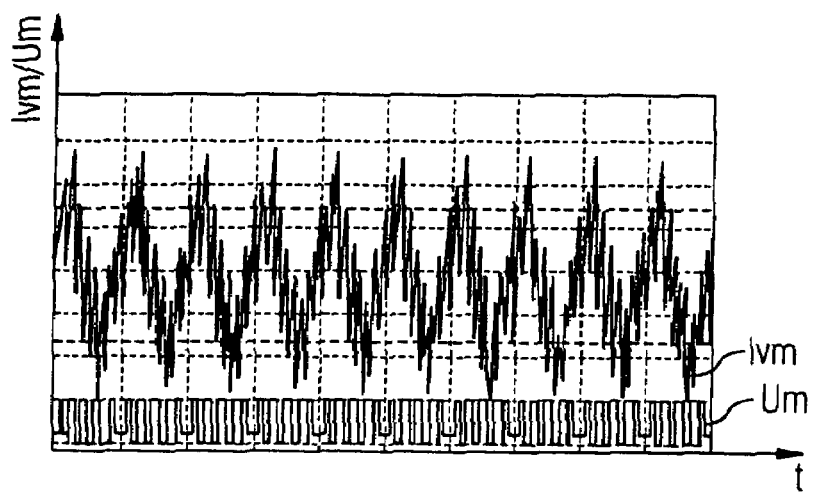
FIG. 8 shows a graph with a current characteristic measured at the solenoid valve and the associated PWM signal.

FIG. 8 shows a further graph in which a plurality of cycles with the valve current Ivm measured at the solenoid valve is shown in the upper region. The low frequency of the dither signal with the high basic frequency can be seen here. The lower region of the graph shows the corresponding PWM voltage Um.

Figure 9:
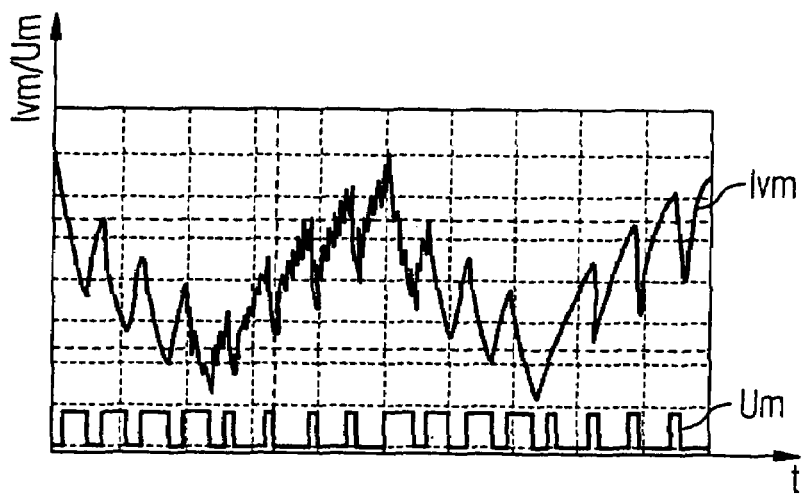
FIG. 9 shows the current and voltage characteristics at the solenoid valve over one cycle.

FIG. 9 shows a further graph in which the current characteristic Ivm and voltage characteristic Um are plotted over a cycle. The upper curve shows the valve current Ivm and the lower curve shows the PMW voltage Um.

We claim:

1. A method for determining a control signal for a solenoid valve, the control signal being a PWM signal on which a frequency of a dither signal is superimposed and having a frequency such that an armature of the solenoid valve assumes an intermediate position between an open position and a closed position at which the armature oscillates with slight excursions at the frequency of the dither signal and an armature current is regulated by a current regulator, which comprises the steps of:

in a computer unit, generating the PWM signal and the dither signal;

with the current regulator, regulating the armature current based at least in part on a difference between a desired current and a current measured at the solenoid valve, the current regulator regulating the armature current independently of the generating the dither signal by the computer unit;

in the computer unit, forming at least one of an amplitude and the frequency of the dither signal to be constant; and in the computer unit, combining the PWM signal with the dither signal to form the control signal.

2. The method according to claim 1, which further comprises setting the frequency of the dither signal to be lower than the frequency of the PWM signal.

3. The method according to claim 1, which further comprises setting the frequency of the dither signal to be an even-numbered divisor of the frequency of the PWM signal.

4. The method according to claim 1, which further comprises setting the frequency of the dither signal, in dependence on a type of the solenoid valve used.

5. The method according to claim 1, which further comprises for forming the dither signal for the PWM signal, forming at least two extended and thereafter two shortened PWM signals.

6. The method according to claim 1, which further comprises switching off the dither signal with a delay in a case of a current step.

7. The method according to claim 1, which further comprises setting the frequency of the dither signal to be a quarter of the frequency of the PWM signal.

8. The method according to claim 1, which further comprises setting the frequency of the dither signal in a range between 100 and 500 Hz.

9. The method according to claim 1, which further comprises forming the dither signal so that the armature of the solenoid valve assumes a central position.

10. A device for controlling a solenoid valve, the device comprising:

a current regulator unit providing a current regulation based at least in part on a difference between a desired current and a current measured at the solenoid valve; and a computer unit being independent of the current regulation of said current regulator unit, said computer unit having a dither unit and a PWM unit coupled to said dither unit, said computer unit forming a PWM signal and a dither signal with at least one of a constant amplitude and a constant frequency;

said current regulator providing the current regulation independently of the forming of the dither signal by said computer unit;

said computer unit combining the PWM signal and the dither signal to form a control signal having a frequency such that an armature of the solenoid valve oscillates with slight excursions at a frequency of the dither signal, said computer unit coupled to said current regulator unit.

11. The device according to claim 10, wherein said computer unit is a time-controlled computer unit.

12. The device according to claim 10, wherein at least one of the PWM signal and the dither signal is formed using a software program.

13. The device according to claim 10, wherein the solenoid valve is used for controlling a mechanical unit in a motor vehicle.

14. The device according to claim 10, wherein the solenoid valve is used for controlling an automatic transmission in a motor vehicle.

* * * * *